(12) United States Patent
Yang et al.

(10) Patent No.: US 10,917,291 B2
(45) Date of Patent: Feb. 9, 2021

(54) RAID CONFIGURATION

(71) Applicant: New H3C Information Technologies Co., Ltd., Hangzhou (CN)

(72) Inventors: Jing Yang, Beijing (CN); Jie Zhang, Beijing (CN); Feng Shi, Beijing (CN)

(73) Assignee: NEW H3C INFORMATION TECHNOLOGIES CO., LTD., Hangzhou (CN)

( * ) Notice: Subject to any disclaimer, the term of this patent is extended or adjusted under 35 U.S.C. 154(b) by 58 days.

(21) Appl. No.: 16/321,860

(22) PCT Filed: Aug. 3, 2017

(86) PCT No.: PCT/CN2017/095767
§ 371 (c)(1),
(2) Date: Jan. 30, 2019

(87) PCT Pub. No.: WO2018/024226
PCT Pub. Date: Feb. 8, 2018

(65) Prior Publication Data
US 2019/0182110 A1     Jun. 13, 2019

(30) Foreign Application Priority Data
Aug. 4, 2016   (CN) .......................... 2016 1 0638713

(51) Int. Cl.
*H04L 12/24*     (2006.01)
*G06F 3/06*      (2006.01)
(Continued)

(52) U.S. Cl.
CPC ............ *H04L 41/0803* (2013.01); *G06F 3/06* (2013.01); *G06F 3/0605* (2013.01);
(Continued)

(58) Field of Classification Search
CPC . H04L 41/0803; H04L 41/20; H04L 61/2015; H04L 41/24; H04L 61/6018;
(Continued)

(56) References Cited

U.S. PATENT DOCUMENTS 7,216,200 B2 * 5/2007 Zhang ................... G06F 3/0605
                                                711/114
7,657,786 B2 * 2/2010 Takuwa .............. G06F 11/2025
                                                  714/13
(Continued)

FOREIGN PATENT DOCUMENTS

| CN | 104104720 | 10/2014 |
| CN | 104219099 | 12/2014 |

(Continued)

OTHER PUBLICATIONS

Office Action issued in counterpart Chinese Application No. 20160638713.X, dated Sep. 17, 2019 (English machine translation).
(Continued)

*Primary Examiner* — Jimmy H Tran
(74) *Attorney, Agent, or Firm* — Norton Rose Fulbright US LLP (57) ABSTRACT

A method and a device for configuring RAID are provided. When a RAID configuration is required, an Integrated Fast Intelligent Scalable Toolkit (IF) start command is sent to each server to perform a RAID configuration in a batch manner. Each server completes the start of the IF based on the received IF start command and sends a RAID configuration command to an Agent in the IF for RAID configuration.

13 Claims, 4 Drawing Sheets

(51) Int. Cl.
    *G06F 13/16*     (2006.01)
    *H04L 29/12*     (2006.01)

(52) U.S. Cl.
    CPC .......... *G06F 3/0632* (2013.01); *G06F 3/0689* (2013.01); *G06F 13/1668* (2013.01); *H04L 41/20* (2013.01); *H04L 61/2015* (2013.01); *H04L 41/24* (2013.01); *H04L 61/6018* (2013.01)

(58) Field of Classification Search
    CPC ........ G06F 3/06; G06F 3/0632; G06F 3/0605; G06F 3/0689; G06F 13/1668; G06F 3/0604; G06F 3/0629
    See application file for complete search history.

(56) References Cited

U.S. PATENT DOCUMENTS

| | | | |
|---|---|---|---|
| 7,865,626 B2* | 1/2011 | Hubis | A61P 31/18 710/5 |
| 8,832,369 B2* | 9/2014 | Zhang | G06F 3/0607 711/114 |
| 8,848,727 B2* | 9/2014 | Saraiya | H04L 49/356 370/428 |
| 9,208,047 B2* | 12/2015 | Mcgraw | G06F 11/3024 |
| 9,350,807 B2* | 5/2016 | Shah | G06F 3/0655 |
| 9,378,103 B2* | 6/2016 | Madhusudana | G06F 9/44 |
| 9,921,783 B2* | 3/2018 | Rose | G06F 3/0689 |
| 10,031,736 B2* | 7/2018 | Lin | G06F 9/4406 |
| 2002/0103913 A1* | 8/2002 | Tawil | G06F 13/387 709/229 |
| 2002/0191602 A1* | 12/2002 | Woodring | H04L 41/12 370/389 |
| 2005/0108474 A1* | 5/2005 | Zhang | G06F 3/0605 711/114 |
| 2006/0174166 A1 | 8/2006 | Manoj | |
| 2007/0233946 A1* | 10/2007 | Jewett | G06F 21/80 711/112 |
| 2008/0288627 A1* | 11/2008 | Hubis | A61P 31/18 709/223 |
| 2009/0106579 A1* | 4/2009 | Takuwa | G06F 11/2025 714/4.4 |
| 2012/0110262 A1* | 5/2012 | Zhang | G06F 3/0629 711/114 |
| 2012/0124331 A1* | 5/2012 | Umemura | G06F 11/2069 711/209 |
| 2013/0117621 A1* | 5/2013 | Saraiya | H04L 49/70 714/748 |
| 2013/0151841 A1* | 6/2013 | McGraw | H04L 41/082 713/100 |
| 2013/0185715 A1* | 7/2013 | Dunning | G06F 9/45558 718/1 |
| 2013/0339600 A1* | 12/2013 | Shah | H04L 67/1097 711/114 |
| 2015/0089130 A1* | 3/2015 | Rose | G06F 3/0607 711/114 |
| 2015/0331765 A1* | 11/2015 | Madhusudana | G06F 11/2058 714/5.11 |
| 2017/0090896 A1* | 3/2017 | Lin | G06F 8/61 |
| 2017/0228228 A1* | 8/2017 | Lin | G06F 8/61 |
| 2017/0277545 A1* | 9/2017 | Dambal | G06F 9/4416 |
| 2019/0377496 A1* | 12/2019 | Olarig | G06F 3/0604 |
| 2020/0249846 A1* | 8/2020 | Bhatia | G06F 11/3034 |

FOREIGN PATENT DOCUMENTS

| | | | | |
|---|---|---|---|---|
| CN | 104615514 | | 5/2015 | |
| CN | 105242875 A | * | 9/2015 | ............... G06F 3/06 |
| CN | 105045689 | | 11/2015 | |
| JP | 2005032185 | | 2/2005 | |
| JP | 2007183837 | | 7/2007 | |

OTHER PUBLICATIONS

Office Action issued in Corresponding Chinese Patent Application No. 201610638713, dated Apr. 10, 2019. (English Translation).

International Search Report and Written Opinion issued in International Patent Application No. PCT/CN2017/095767, dated Oct. 26, 2017.

Extended European Search Report issued in Corresponding European Patent Application No. 17836408, dated Jun. 21, 2019.

Office Action issued in Corresponding Japanese Application No. 2019-506091, dated Apr. 7, 2020 (English Translation provided).

User Guide for Hitachi Advanced Server HA8000V Series, remote management section, 2nd edition, pp. 93-94, online, Apr. 2016, Hitachi limited company ICT business management headquarter, searched on Mar. 3, 2019, web address: http://itdoc.hitachi.co.jp/manuals/ha8000/hard/xn/9_remotemanagement/r44bn01600/R44BN01600-2.pdf (English Translation provided).

* cited by examiner

RAID CONFIGURATION

CROSS REFERENCE TO RELATED APPLICATION

This application is a national phase under 35 U.S.C. § 371 of International Application No. PCT/CN2017/095767, filed Aug. 3, 2017, which claims priority to Chinese Patent Application No. 201610638713.x, filed Aug. 4, 2016, the entire contents of each of which are incorporated herein by reference in their entirety.

BACKGROUND

In an application of managing a hard disk with a RAID, the RAID is often pre-configured, otherwise, the hard disk cannot be identified and an operating system cannot be installed.

The manner of configuring a RAID may be a Smart Storage Administrator (SSA) manner, which belongs to a manual configuration manner, for example, manually entering an Intelligent Provisioning (IP) page of a server, manually selecting the Perform Maintenance page in the IP page, manually selecting the SSA in the Perform Maintenance page to enter the SSA configuration page, and manually performing the operation of the RAID configuration on the SSA configuration page.

BRIEF DESCRIPTION OF THE DRAWINGS

The drawings here are incorporated into and constitute a part of this specification, showing examples coincident with the present disclosure and, serve together with the specification to explain the principles of the present disclosure.

DETAILED DESCRIPTION OF THE EXAMPLES

The technical solution in the examples of the present disclosure will be clearly and fully described in conjunction with the drawings in the examples of the present disclosure below. It will be apparent that the described examples are merely part of the examples of the present disclosure rather than all of the examples. All other examples obtained by those skilled in the art based on the examples of the present disclosure without making creative work fall within the scope of protection of the present disclosure.

Figure 1:
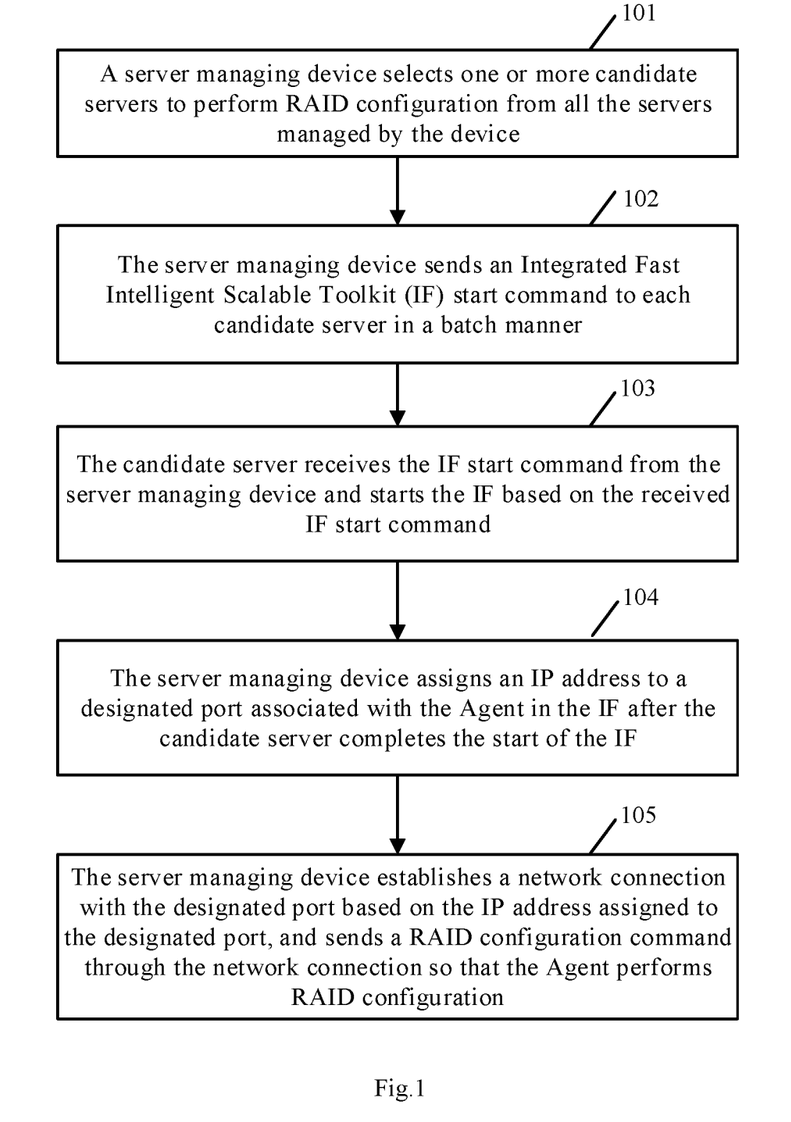
FIG. 1 illustrates a flowchart of a method of configuring a RAID according to the present disclosure.

FIG. 1 illustrates a flowchart of a method of configuring a RAID according to the present disclosure. As shown in FIG. 1, the method may include the following blocks.

At block 101: A server managing device selects one or more candidate servers to be performed RAID configuration from all the servers managed by the device.

In practical application, a server managing device may manage a plurality of servers, but not every server needs to perform RAID configuration. Based on this, in the present disclosure, a server to be performed RAID configuration may be selected from all the managed servers according to the actual needs. To be distinguished from servers not to be performed RAID configuration, herein, the server to be performed RAID configuration is referred to as a candidate server.

At block 102: The server managing device sends an Integrated Fast Intelligent Scalable Toolkit (IF) start command to each of the candidate servers in a batch manner.

At block 103: The candidate server receives the IF start command from the server managing device and starts the IF based on the received IF start command.

In the present disclosure, each candidate server may be associated with a corresponding IF. Therefore, in the Block 103, the IF started by the candidate server based on the received IF start command is the IF associated with the candidate server. In the present disclosure, an IF may be a common operating system, such as linux, windows or other systems, and is provided with an Agent and RAID configuration tool, and customizes a start item so that the agent can be run automatically when started.

In an example of the present disclosure, a Secure Digital Card (SD card) may be installed locally in each candidate server, and the IF associated with the candidate server is stored in the SD card. Based on this, in the Block 103, the candidate server starts the IF based on the received IF start command specifically as follows: the candidate server starts the SD card that has been installed in the server based on the received IF start command first, and enters the IF associated with the candidate server from the SD card so as to start the IF associated with the candidate server.

In another example of the present disclosure, the IF associated with the candidate server may not be stored in a SD card, so that each of the candidate servers does not need to install the SD card. For example, the IF associated with the candidate server may be stored in a remote Pre-boot Execution Environment (PXE) server, or loaded in a manner of mounting an image file by a CD-ROM, or stored on other storage media. In the present disclosure, the storage location of the IF of the present disclosure is not limited as long as it is guaranteed to start from the IF. The present disclosure does not particularly limit the manner of starting an IF when the IF is stored in a remote PXE server, or loaded in a manner of mounting an image file by a CD-ROM, or stored on other storage media. Those skilled in the art may use an attainable manner on the premise of starting from the IF.

At block 104: The server managing device assigns an IP address to a designated port associated with the Agent in the IF after a candidate server completes the start of the IF.

At block 105: The server managing device establishes a network connection with the designated port based on the IP address assigned to the designated port, and sends a RAID configuration command through the network connection so as to cause the Agent to perform RAID configuration.

Thus, the flow shown in FIG. 1 is completed.

As may be seen from the flow shown in FIG. 1, in the present disclosure, when a RAID configuration is required, an IF start command is sent in a batch manner to each server to perform RAID configuration, so that each server starts the IF based on the received IF start command and sends a RAID configuration command to the Agent in each IF that has been started for RAID configuration. On the one hand, it may be achieved to configure the RAID in a batch manner without requiring each server to enter a Basic Input Output System (BIOS) to perform RAID configuration one by one, which improves the efficiency of RAID configuration. On the other hand, a server managing device may control each server requiring RAID configuration to perform RAID configuration, which facilitates operation and saves human resources costs.

In application, the server has a dedicated service processor that may use a sensor to monitor the state of a computer, a network server, or other hardware driving devices, and communicate with a system administrator through a separate connection line. The service processor is referred to as a Baseboard Management Controller (BMC). The BMC is a part of an Intelligent Platform Management Interface (IPMI) and is typically included in a main circuit board of a template or a monitored device.

Based on this, as an example of the present disclosure, sending an IF start command to each candidate server in a batch manner in the above Block 102 specifically includes: sending an IF start command to the BMC in each candidate server in a batch manner. As an example, the IF start command here is valid only once, and is not permanently valid by default.

Similarly, the candidate server receives the IF start command from the server managing device and starts the IF based on the received IF start command in the above Block 103, specifically including: the BMC in the candidate server receives the IF start command from the server managing device and starts the associated IF based on the received IF start command. As an example, after the BMC in the candidate server receives the IF start command from the server managing device, other systems may have been started in the server at this time. In this case, the BMC in the candidate server also needs to restart a Basic Input Output System (BIOS) first, and then start the associated IF.

As an example, in the Block 104 described above, assigning an IP address to a designated port associated with the Agent in the IF that has been started may specifically include the following blocks.

At block a1: The Agent in the IF is started through a custom start item in the IF that has been started;

At block a2: The started Agent is associated with the designated port; and

At block a3: An IP address may be assigned to the designated port associated with the Agent by using a Dynamic Host Configuration Protocol (DHCP). In the present disclosure, as to how to assign an IP address to a designated port associated with an Agent by using the DHCP, the existing method of assigning an IP address may be used, which is not particularly limited in the present disclosure.

As described above, the above IF start command is valid only once, will become invalid after a RAID configuration is completed. In particular, in the present disclosure, the server managing device further sends an IF exit command to a candidate server (specifically, a BMC) associated with an IF after it is monitored that an Agent in the IF completes RAID configuration.

After receiving the IF exit command, the candidate server (specifically, BMC) exits from the IF.

As an example, a candidate server locally installs an SD card and an IF associated with the candidate server is stored in the SD card. The above method provided in the present disclosure is described below based on this example.

Figure 2:
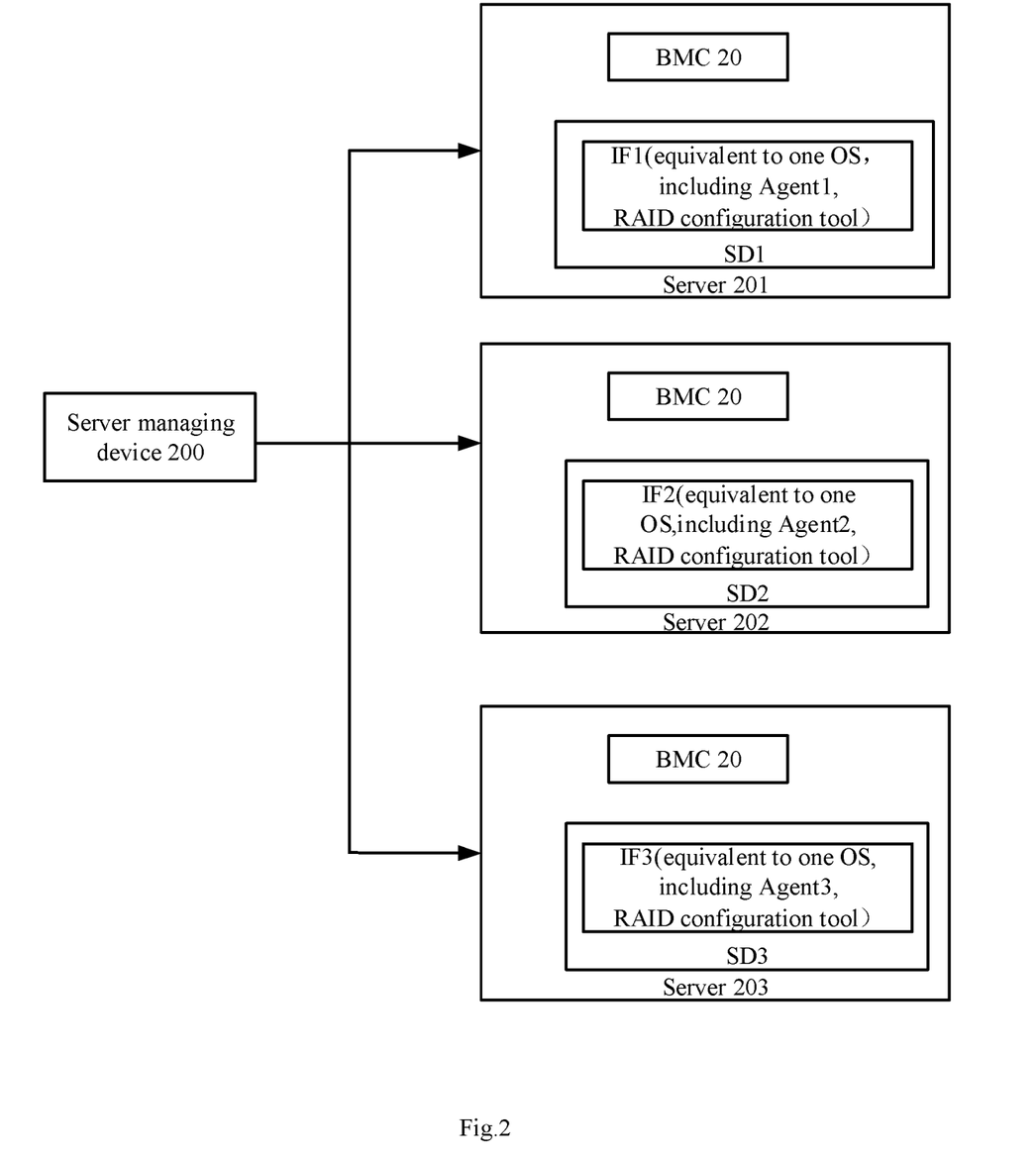
FIG. 2 illustrates a schematic diagram of an example in which the method of configuring a RAID shown in FIG. 1 is applied according to the present disclosure.

FIG. 2 illustrates a schematic diagram of an example provided according to the present disclosure. In FIG. 2, there are three servers: Server 201 to Server 203. All of the Servers 201-203 contain BMC 20. The Server 201 to the Server 203 also contain modules other than the BMC 20, which will not be described one by one due to not being involved in the present example.

In FIG. 2, the Server 201 to the Server 203 pre-install a SD card respectively. The SD card installed in the Server 201 is denoted as SD1, the SD card installed in the Server 202 is denoted as SD2, and the SD card installed in the Server 203 is denoted as SD3.

In FIG. 2, the SD1 is pre-stored with IF (referred to as IF1) associated with the SD1, the SD2 is pre-stored with IF (referred to as IF2) associated with the SD2, and the SD3 is pre-stored with IF (referred to as IF3) associated with the SD3.

A server managing device 200 shown in FIG. 2 manages the Server 201 to the Server 203. All of the Servers 201-203 shown in FIG. 2 are to perform RAID configuration.

As shown in FIG. 2, the server managing device 200 sends an IF start command to the BMC 20 of the Server 201 to the Server 203 in a batch manner.

If the BMC 20 in the Server 201 determines that other operating systems are currently started after receiving the IF start command, the BMC 20 restarts the BIOS, then starts the SD1, and enters the IF1 from the SD1 to start the IF1.

If the BMC 20 in the Server 202 determines that other operating systems are currently started after receiving the IF start command, the BMC 20 restarts the BIOS, then starts the SD2, and enters the IF2 from the SD2 to start the IF2.

If the BMC 20 in the Server 203 determines that other operating systems are currently started after receiving the IF start command, the BMC 20 restarts the BIOS, then starts the SD3, and enters the IF3 from the SD3 to start the IF3.

After completing the start of the IF1, the server managing device 200 starts an Agent (denoted as Agent1) in the IF1 through a customized start item in the IF1, and associates the Agent1 with a designated port (denoted as Port1_1). Thereafter, an IP address (denoted IP1_1) is assigned to the Port1_1 according to the DHCP requirement.

After completing the start of the IF2, the server managing device 200 starts an Agent (denoted as Agent2) in the IF2 through a customized start item in the IF2, and associates the Agent2 with a designated port (denoted as Port1_2). Thereafter, an IP address (denoted IP1_2) is assigned to the Port1_2 according to the DHCP requirement.

After completing the start of the IF3, the server managing device 200 starts an Agent (denoted as Agent3) in the IF3 through a customized start item in the IF3, and binds the Agent3 to a designated port (denoted as Port1_3). Thereafter, an IP address (denoted IP1_3) is assigned to the Port1_3 according to the DHCP requirement.

Thereafter, the server managing device 200 may, as a client, establish a network connection with the designated port Port1_1; and send a RAID configuration command organized according to a preset data protocol format to the Agent1 through the established network connection. After receiving the RAID configuration command, the Agent1 calls a RAID configuration tool in the IF1 for RAID configuration.

Similarly, the server managing device 200 may, as a client, establish a network connection with the designated port Port1_2; and send a RAID configuration command organized according to a preset data protocol format to the Agent2 through the established network connection. After receiving the RAID configuration command, the Agent2 calls a RAID configuration tool in the IF2 for RAID configuration.

The server managing device 200 may, as a client, establish a network connection with the designated port Port1_3; and send a RAID configuration command organized according to a preset data protocol format to the Agent3 through the established network connection. After receiving the RAID configuration command, the Agent3 calls a RAID configuration tool in the IF3 for RAID configuration.

The above method achieves the purpose of configuring a RAID in a batch manner, and improves the efficiency of RAID configuration. Moreover, the RAID configuration is dynamically implemented by a server managing device, which facilitates operation and saves human resources costs.

The server managing device 200 sends an IF exit command to the BMC 20 in the Server 201 after the Agent1 completes the RAID configuration. The BMC 20 in the Server 201 exits from the IF after receiving the IF exit command.

Similarly, the server managing device 200 sends an IF exit command to the BMC 20 in the Server 202 after the Agent2 completes the RAID configuration. The BMC 20 in the Server 202 exits from the IF after receiving the IF exit command. The server managing device 200 sends an IF exit command to the BMC 20 in the Server 203 after the Agent3 completes the RAID configuration. The BMC 20 in the Server 203 exits from the IF after receiving the IF exit command.

Thus, the description of the example shown in FIG. 2 is completed.

The method provided by the present disclosure has been described above. A device provided by the present disclosure will be described below.

Figure 3:
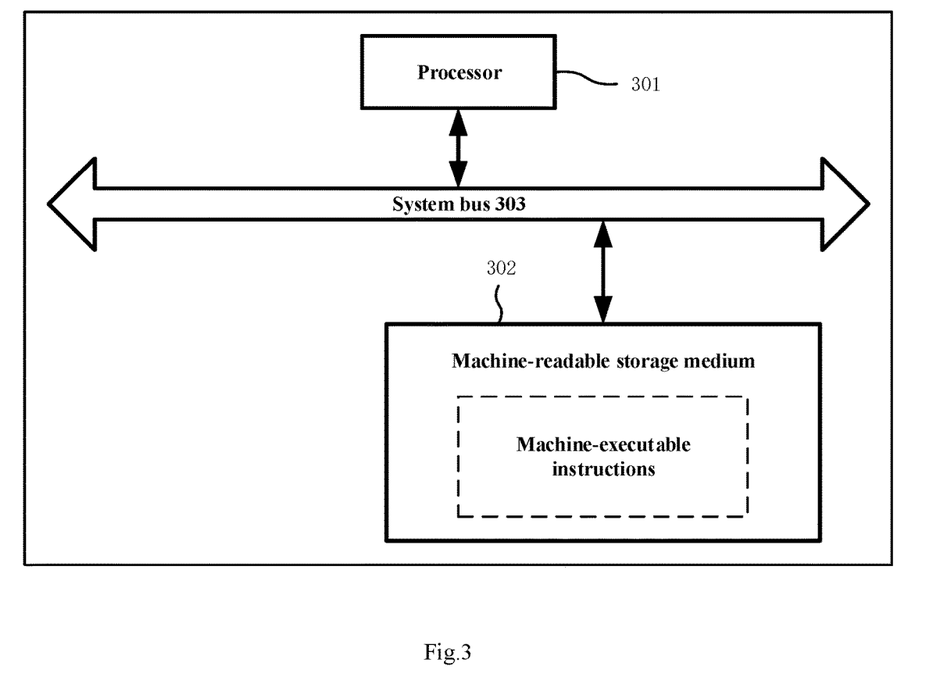
FIG. 3 illustrates a hardware structural diagram of a server managing device according to the present disclosure.

FIG. 3 illustrates a hardware structural diagram of a server managing device according to an example of the present disclosure.

As shown in FIG. 3, the device may include a processor 301, and a machine-readable storage medium 302 having machine-executable instructions stored thereon. The processor 301 and the machine-readable storage medium 302 may communicate with each other via a system bus 303. Moreover, the processor 301 may perform the method of configuring the RAID described above by reading and executing the machine-executable instructions corresponding to RAID configuring logic in the machine-readable storage medium 302.

The machine-readable storage medium 302 and other storage media referred to herein may be any electronic, magnetic, optical, or other physical storage devices in which information may be contained or stored such as executable instructions, data, etc. For example, the machine-readable storage media may be a Radom Access Memory (RAM), a volatile memory, a non-volatile memory, a flash memory, a storage drive (such as a hard disk drive), a solid state drive, any type of storage discs (such as compact discs, DVDs, etc.), or a similar storage media, or a combination thereof.

Figure 4:
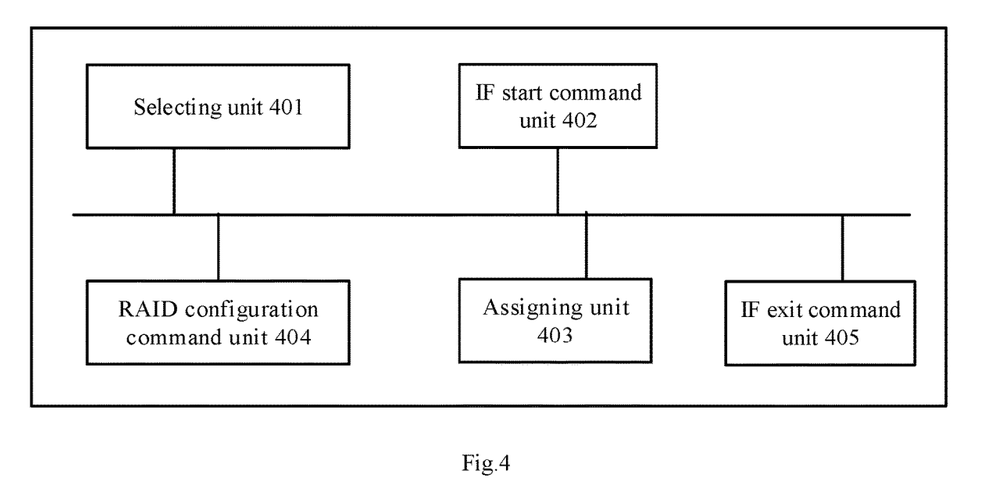
FIG. 4 illustrates a structural diagram of functional modules of the device shown in FIG. 3 according to the present disclosure.

As shown in FIG. 4, functionally divided, the RAID configuring logic described above may include the following functional units:

a selecting unit 401 configured to select one or more candidate servers to be performed RAID configuration from all servers managed by the server managing device;

an IF start command unit 402 configured to send an Integrated Fast Intelligent Scalable Toolkit (IF) start command to each of the candidate servers in a batch manner;

an assigning unit 403 configured to assign an IP address to a designated port associated with an Agent in an IF which is started by the candidate server based on the IF start command; and a RAID configuration command unit 404 configured to establish a network connection with the designated port based on the IP address assigned to the designated port, and send a RAID configuration command through the network connection so as to cause the Agent to perform the RAID configuration.

In an example, the assigning unit 403 assigns an IP address to a designated port associated with an Agent in an IF, including:

starting the Agent in the IF through a customized start item in the IF;

associating the started Agent with the designated port; and assigning the IP address to the designated port by using a Dynamic Host Configuration Protocol (DHCP).

In an example, the device further includes: an IF exit command unit 405 configured to send an IF exit command to a candidate server after monitoring that the Agent in the IF started by the candidate server completes the RAID configuration.

In an example, the IF start command unit 402 sends an IF start command to a Baseboard Management Controller (BMC) in each candidate server so as to cause the BMC to start the IF associated with the candidate server based on the received IF start command.

According to an example of the present disclosure, there is further provided a method of configuring a RAID performed on a server side, including that:

a server receives an Integrated Fast Intelligent Scalable Toolkit (IF) start command from a server managing device;

the server starts an IF based on the received IF start command; and the server establishes a network connection with the server managing device through a designated port based on an IP address assigned by the server managing device to the designated port associated with an Agent in the IF after the IF is started, so that the Agent receives a RAID configuration command from the server managing device through the network connection and performs a RAID configuration according to the RAID configuration command.

In an example, the server receives an IF exit command from the server managing device after the Agent in the IF completes the RAID configuration; and the server exits from the IF according to the IF exit command.

Figure 5:
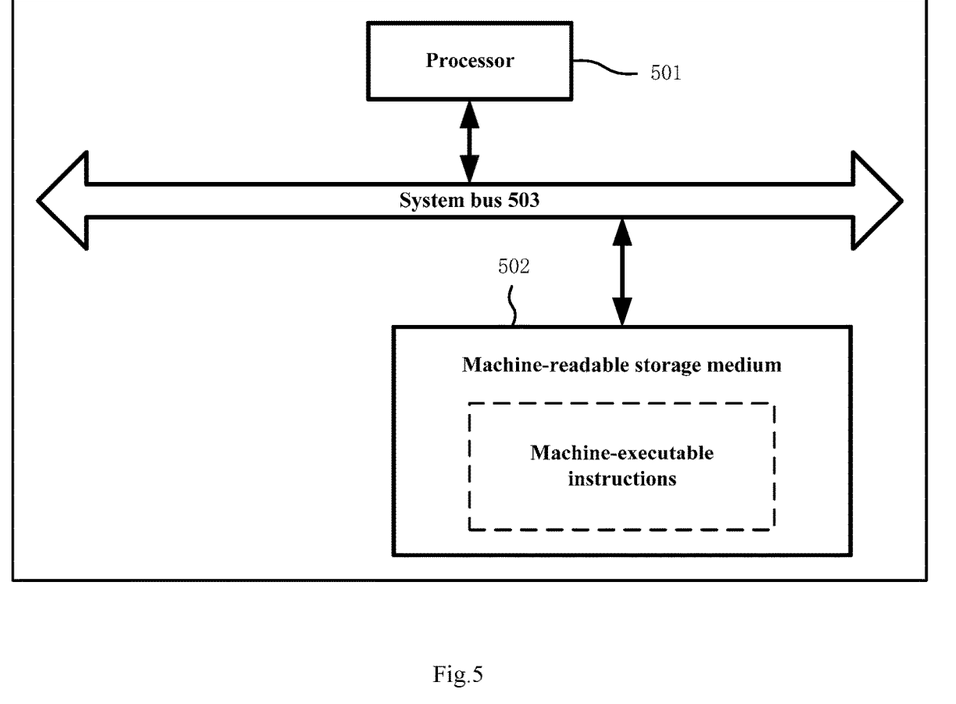
FIG. 5 illustrates a hardware structural diagram of a server according to the present disclosure.

According to an example of the present disclosure, there is further provided a device for configuring a RAID. FIG. 5 illustrates a structural diagram of another device provided according to the present disclosure, which is applied to a server.

As shown in FIG. 5, the device may include a processor 501, and a machine-readable storage medium 502 having machine-executable instructions stored thereon. The processor 501 and the machine-readable storage medium 502 may communicate with each other via a system bus 503. Moreover, the processor 501 may perform the method of configuring a RAID described above by reading and executing machine-executable instructions corresponding to RAID configuring logic in the machine-readable storage medium 502.

Figure 6:
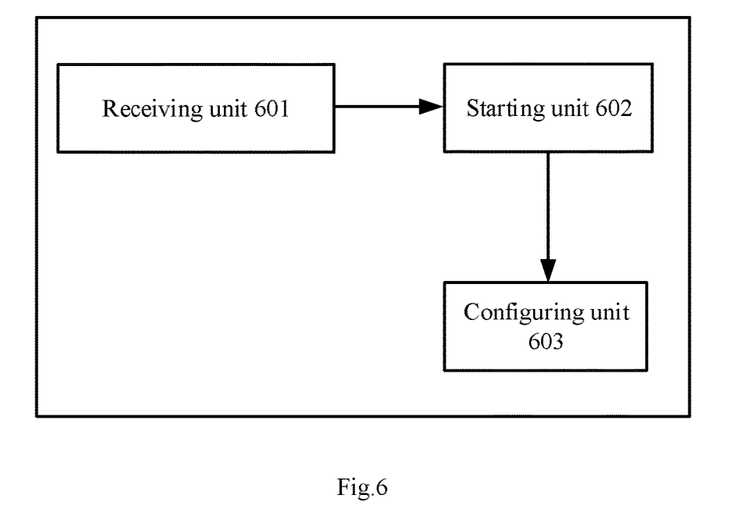
FIG. 6 illustrates a structural diagram of functional modules of the server shown in FIG. 5 according to the present disclosure.

As shown in FIG. 6, functionally divided, the RAID configuring logic described above may include the following functional units:

a receiving unit 601 configured to receive an Integrated Fast Intelligent Scalable Toolkit (IF) start command from a server managing device;

a starting unit 602 configured to start an IF based on the received IF start command; and a configuring unit 603 configured to establish a network connection with the server managing device through a designated port based on an IP address assigned by the server managing device to the designated port associated with an Agent in the IF after the IF is started, so that the Agent receives a RAID configuration command from the server managing device through the network connection and performs a RAID configuration according to the RAID configuration command.

In an example, the receiving unit 601 further receives an IF exit command from the server managing device after the Agent in the IF completes the RAID configuration; and the starting unit 602 further exits from the IF according to the IF exit command.

According to an example of the present disclosure, there is further provided a machine-readable storage medium having machine-executable instructions stored thereon, where when being invoked and executed by a processor, the machine-executable instructions cause the processor to:

select one or more candidate servers to be performed RAID configuration from all servers managed by the server managing device;

send an Integrated Fast Intelligent Scalable Toolkit (IF) start command to each of the candidate servers in a batch manner;

assign an IP address to a designated port associated with an Agent in an IF which is started by the candidate server based on the IF start command; and establish a network connection with the designated port based on the IP address assigned to the designated port, and send a RAID configuration command through the network connection so as to cause the Agent to perform the RAID configuration.

Wherein, assigning the IP address to the designated port associated with the Agent in the IF includes that:

the server managing device starts the Agent in the IF through a customized start item in the IF;

the server managing device associates the started Agent with the designated port; and the server managing device assigns the IP address to the designated port by using a Dynamic Host Configuration Protocol (DHCP).

An IF exit command may be sent to the candidate server after it is monitored that the Agent in the IF started by the candidate server completes the RAID configuration.

Wherein, sending the IF start command to each candidate server in a batch manner includes that: the server managing device sends an IF start command to a Baseboard Management Controller (BMC) in each candidate server so as to cause the BMC to start the IF associated with the candidate server based on the received IF start command.

In the present disclosure, when RAID configuration is required, an IF start command is sent to each server to perform the RAID configuration in a batch manner so that each server completes the start of the IF based on the received IF start command and sends an RAID configuration command to the Agent in each IF for RAID configuration. On the one hand, it may be achieved to configure a RAID in a batch manner without requiring each server to enter BIOS to perform RAID configuration one by one, which improves the efficiency of RAID configuration. On the other hand, a server managing device may control each server requiring RAID configuration to perform RAID configuration, which facilitates operation and saves human resources costs.

The foregoing is merely illustrative of the preferred examples of the present disclosure and is not intended to limit the present disclosure. Any modifications, equivalent substitutions, improvements, etc., made within the spirit and principle of the present disclosure shall be encompassed in the scope of protection of the present disclosure.

The invention claimed is:

1. A method of configuring redundant arrays of independent disks (RAID), comprising:
    selecting, by a server managing device, one or more candidate servers to be performed RAID configuration from all servers managed by the device;
    sending, by the server managing device, an Integrated Fast Intelligent Scalable Toolkit (IF) start command to each of the candidate servers in a batch manner;
    assigning, by the server managing device, an Internet Protocol (IP) address to a designated port associated with an Agent in an IF which is started by a candidate server based on the IF start command; and
    establishing, by the server managing device, a network connection with the designated port based on the IP address assigned to the designated port, and sending, by the server managing device, a RAID configuration command through the network connection, so as to cause the Agent to perform the RAID configuration.

2. The method according to claim 1, wherein assigning the IP address to the designated port associated with the Agent in the IF comprises:
    starting, by the server managing device, the Agent in the IF through a customized start item in the IF;
    associating, by the server managing device, the started Agent with the designated port; and
    assigning, by the server managing device, the IP address to the designated port by using a Dynamic Host Configuration Protocol (DHCP).

3. The method according to claim 1, further comprises:
    sending, by the server managing device, an IF exit command to the candidate server after monitoring that the Agent in the IF started by the candidate server completes the RAID configuration.

4. The method according to claim 1, wherein sending the IF start command to each of the candidate servers in a batch manner comprises:
    sending, by the server managing device, an IF start command to a Baseboard Management Controller (BMC) in each of the candidate servers, so as to cause the BMC to start the IF associated with the candidate server based on the received IF start command.

5. A method of configuring redundant arrays of independent disks (RAID), comprising:
    receiving, by a server, an Integrated Fast Intelligent Scalable Toolkit (IF) start command from a server managing device;
    starting, by the server, an IF based on the received IF start command; and
    establishing, by the server, a network connection between the server managing device and a designated port based on an Internet Protocol (IP) address after the IF is started, such that the Agent is capable of receiving a RAID configuration command from the server managing device through the network connection and performing a RAID configuration according to the RAID configuration command, wherein the designated port is associated with an Agent in the IF and the IP address is assigned to the designated port by the server managing device.

6. The method according to claim 5, wherein the method further comprises:
    receiving, by the server, an IF exit command from the server managing device after the Agent in the IF completes the RAID configuration; and
    exiting, by the server, from the IF according to the IF exit command.

7. A server managing device comprising:
a processor; and
a non-transitory machine-readable storage medium stored with machine-executable instructions which are executable by the processor to cause the processor to:
select one or more candidate servers to be performed RAID configuration from all servers managed by the server managing device;
send an Integrated Fast Intelligent Scalable Toolkit (IF) start command to each of the candidate servers in a batch manner;
assign an Internet Protocol (IP) address to a designated port associated with an Agent in an IF which is started by a candidate server based on the IF start command; and
establish a network connection with the designated port based on the IP address assigned to the designated port, and
send a RAID configuration command through the network connection so as to cause the Agent to perform the RAID configuration.

8. The device according to claim 7, wherein when assigning the IP address to the designated port associated with the Agent in the IF, the processor is further caused by the machine-executable instructions to:
start the Agent in the IF through a customized start item in the IF;
associate the started Agent with the designated port; and
assign the IP address to the designated port by using a Dynamic Host Configuration Protocol (DHCP).

9. The device according to claim 7, wherein the processor is further caused by the machine-executable instructions to:
send an IF exit command to the candidate server after monitoring that the Agent in the IF started by the candidate server completes the RAID configuration.

10. The device according to claim 7, wherein when sending the IF start command to each of the candidate servers in a batch manner, the processor is further caused by the machine-executable instructions to:
send an IF start command to a Baseboard Management Controller (BMC) in each of the candidate servers so as to cause the BMC to start the IF associated with the candidate server based on the received IF start command.

11. A device comprising:
a processor; and
a non-transitory machine-readable storage medium stored with machine-executable instructions which are executable by the processor to cause the processor to perform the method of configuring redundant arrays of independent disks (RAID) according to claim 5.

12. The device according to claim 11, wherein the processor is further caused by the machine-executable instructions to:
receive an IF exit command from the server managing device after the Agent in the IF completes the RAID configuration; and
exit from the IF according to the IF exit command.

13. A non-transitory machine-readable storage medium stored with machine-executable instructions which are invoked and executed by a processor to cause the processor to perform the method of configuring redundant arrays of independent disks (RAID) according to claim 1.

* * * * *